United States Patent [19]

Voisin

[11] 4,371,559

[45] Feb. 1, 1983

[54] PROCESS FOR LOWERING THE FREEZING POINT OF ANISE ESSENCES AND ANETHOLE BY NATURAL PRODUCTS

[76] Inventor: Max Voisin, 23, Rue Fourcroy, 75017 Paris, France

[21] Appl. No.: 265,942

[22] Filed: May 21, 1981

[30] Foreign Application Priority Data

May 22, 1980 [LU] Luxembourg .......................... 82480

[51] Int. Cl.$^3$ ........................ A23L 1/22; A23L 1/226
[52] U.S. Cl. ................................... 426/538; 426/590; 426/592; 426/651
[58] Field of Search ................ 426/590, 651, 592, 538

[56] References Cited

U.S. PATENT DOCUMENTS 2,712,008  6/1955  Kirchner et al. ............... 426/651 X
3,988,432  10/1976  Steltenkamp .................. 426/590 X

OTHER PUBLICATIONS

Arctander, Perfume and Flavor Chemicals, vols. I & II, 1969, Montclair, N.J., Item Nos. 236, 579, 580, 649, 669, 670, 1784-1786, 1800, 1801, 2460, 2619, 2620, 2769, 2940.

Daniels et al., Physical Chemistry, 3rd Ed., 1966, John Wiley & Sons: New York, pp. 156-156.
Chemicals Used in Food Processing, Publ. 1274, 1965, Nat. Acad. of Science: Wash., D.C., pp. 78, 209, 210.
Herstein et al., Wines and Liquors, 1948, Van Nostraud Co.: New York, pp. 230-233.
Rose, Alcoholic Beverages, vol. I, 1977, Academic Press: New York, pp. 564*; 578-579.
Fenarolis Handbook of Flavor Ingredients, 2nd Ed., 1975, CRC Press: Cleveland, Ohio, vol. I-pp. 278, 279, 469, 470; vol. II-pp. 34, 617.
Food Chemical Codex, 2nd Ed., 1972, Nat. Acad. of Sciences: Wash., D.C., pp. 56-57.
Merory Food Flavorings, 2nd Ed., 1968, Avi.: Westport, Conn., pp. 121, 390-391.

*Primary Examiner*—Joseph M. Golian
*Attorney, Agent, or Firm*—Beveridge, DeGrandi and Kline

[57] ABSTRACT

The invention relates to a process enabling the freezing point of anise essence and anethole based drinks to be lowered by adding in a natural product that is soluble and miscible in anethole and alcohols, having a very low melting point, this product having had its wax and odor removed, which prevents flakes or leaflets from forming in this type of beverage.

4 Claims, No Drawings

PROCESS FOR LOWERING THE FREEZING POINT OF ANISE ESSENCES AND ANETHOLE BY NATURAL PRODUCTS

For a long time chemists have been looking for methods of lowering the freezing point of anise essences or anethole with natural products. The freezing point of these products varies between 16° and 18° C. depending on the product quality.

Serious shortcomings result for the aniseed drink manufacturer and for consumers. As soon as the weather turns cold numerous precautions have to be taken to prevent the anethole freezing in the form of flakes floating in the liquid medium:

for manufacturers, constant-temperature delivery trucks, expensive special packaging cartons, storage in premises heated to 20° C.

for the retailer and housewives the drawback remains the same and remelting frozen anetholeflakes in the alcohol or aqueous medium raises problems which many users have difficulty in solving or never solve at all.

The goal aimed at by the inventor was not to use a chemical, which means the drink loses its quality of being a natural product, but, on the contrary, to discover one or more natural products capable of lowering the anethole freezing point to around -4° C. but, which is very important, without adversely affecting the taste.

This invention is based on the discovery and development, after long studies and the examination and testing of innumerable products, of several groups of natural products allowing the freezing point of anethole to be lowered.

The process which is the object of this invention is basically characterized in that the anethole is mixed with a natural product that is soluble or miscible in the anethole and in alcohols acceptable in foodstuffs having a very low melting point of around -20° C. in sufficient proportions to lower the freezing point of the anethole without changing the appearance of the product or affecting its taste.

The natural products more specifically usable according to the invention are chosen amongst the terpene and sesquiterpene groups like, for example, pinene, dispentene, limonene, phellandrene, etc., amongst the aldehyde groups, like citral, citronellol, etc. and amongst the ketone groups like, for example, irone, carvone, pulegone, thujone, etc.

This choice is not restrictive and any product belonging to these groups or to any other group that is suitable for use in foodstuffs and enables the anethole freezing point to be lowered is envisaged.

Orange terpene and limonene are products more especially preferred according to the invention.

These various products, although they have existed for a long time in nature, had nevertheless never been used for this purpose since their property and their composition made them unsuitable a priori for the use envisaged according to the present invention.

Thus these products are known for being highly odoriferous, which meant that using them might give the aniseed drink a taste differing from the one sought after. Furthermore, these products often contain waxes which would have meant the composition would turn cloudy; this is also a drawback for the consumer.

The applicant has now discovered that it is possible to use these natural products, and especially limonene and orange terpene, by carrying out a first-stage odour removal using activated vegetable carbon.

For this purpose 20 to 40 g per liter of activated carbon is used per liter of product depending on the quality and the odour adsorbent capacity of the carbon used.

In this way it is possible to eliminate the odours of the substances treated and thus not to affect the taste of aniseed drinks in the application according to the invention.

It is obvious that other odour removal methods may be used such as steam jets, rectification, etc.

The second treatment stage was to subject the products utilizable in accordance with the invention to a dewaxing process. To this end the products like limonene or orange terpene are mixed with magnesium carbonate after being dissolved in 90% alcohol to the extent of 25 to 40 g of magnesium carbonate per liter.

The mixture is lowered to a temperature ranging from 0 to over 2° C. in order to cause the waxy or undesirable products to be precipitated out and then the whole is filtered.

It is observed that the products thus treated no longer lead to clouding in 45% alcohol anise drinks which remain perfectly clear.

The products complying with the invention must also have freezing point which is around $-21°$ to $-23°$ C. in the pure state and be used in such proportions as to having a freezing point in a mixture consisting of one part of additive and one part of anethole of around $-4$ to $-6°$ C.

The odour and wax removal processes used according to the invention may also be applied to the alcohol solution containing the natural additive, in which case the temperature is lowered to about $+2°$ C. and after filtering the treated solution is ready for use.

The following examples are to illustrate the invention without necessarily being restrictive.

EXAMPLE 1

Manufacture of a "natural anti-freeze" additive. The following mixture is made up:

| 90% alcohol (ethanol) | 900 cc |
| --- | --- |
| D-limonene | 100 cc |
| Activated vegetable carbon | 30 g |
| Magnesium carbonate | 30 g |

The mixture temperature is lowered to $+2°$ C. and subsequently it is filtered. The resulting solution is ready for use.

EXAMPLE 2

In this case an orange terpene solution is used which has had its odour and wax removed and is contained in 90% alcohol. The following composition is made up:

| 90% alcohol (ethanol) | 900 cc |
| --- | --- |
| Orange terpene | 100 cc |
| Activated vegetable carbon | 30 g |
| Magnesium carbonate | 30 g |

The temperature of the mixture is lowered to about $+2°$ C., it is filtered and the solution is ready for use.

EXAMPLE 3

500 g of anethole is mixed with 500 g of d-limonene treated with activated vegetable carbon and magnesium carbonate as indicated in example 1. The mixture thus obtained has a freezing point of −4° C.

EXAMPLE 4

A mixture is made up containing 666 g of anethole and 334 g of orange terpene treated with activated vegetable carbon and magnesium carbonate as indicated in example 2. The freezing point of this mixture is +2° C.

EXAMPLE 5

Manufacture of a 45% alcohol anise drink.
The following products are mixed together:

| | |
|---|---|
| Anethole | 2 g |
| Liquorice extract | 1 g |
| Deodorized/dewaxed limonene | 20 cc |
| 90% alcohol (ethanol) | 500 cc |
| Water | 500 cc |

The anethole followed by the limonene-based additive are dissolved in 90% alcohol. The liquorice extract is then dissolved in the water and the two liquids are mixed. The freezing point of the composition according to this example is −4° C.

EXAMPLE 6

Manufacture of an aniseed soft drink. The following composition is prepared for 1 liter:

| | |
|---|---|
| Anethole | 2 g |
| Liquorice extract | 1 g |
| Additive based on orange terpene with odour and wax removed as described in example 2 | 10 cc |
| Modified gum arabic | 10 g |
| Water | 1000 cc. |

First of all the gum arabic is dissolved in the water and then the anethole is introduced and subsequently the orange terpene and finally the liquorice extract. The dissolving and emulsifying operations are carried out in an emulsifying appliance rotating at 3,000 r.p.m. The freezing point is +2° C.

EXAMPLE 7

The following composition is prepared for 100 liters:

| | |
|---|---|
| Anise essence or anethole | 200 g |
| Deodorized and dewaxed limonene | 200 g |
| Glycyrrhyzin | 50 g |
| Caramel | 100 g |
| 45% alcohol (ethanol) | 100 liters. |

The freezing point of this composition is −4° to −5° C.

I claim:

1. A process for lowering the freezing point of anise essense or anethole which comprises adding thereto an amount of an orange terpene, a limonene or mixture thereof sufficient to lower the freezing point of said anise essence or anethole to between about −4° and −6° C., said orange terpene, limonene or mixture thereof being soluble and miscible with said anise essence or anethole and an alcohol acceptable in foodstuffs and having been deodorized with activated vegetable carbon and dewaxed.

2. The process according to claim 1 wherein said orange terpene, limonene or mixture thereof is dewaxed by dissolving in 90% alcohol, adding to the resultant solution from 25 to 40 grams per liter of magnesium carbonate, reducing the temperature of the mixture to between 0° and 2° C. to cause precipitation of the wax substances and separating said wax substances therefrom.

3. A drink based on anise essence or anethole and alcohol useful for human consumption, said drink containing also an orange terpene, a limonene or a mixture thereof in an amount sufficient to lower the freezing point of said anise essence or anethole to between about −4° and −6° C., said orange terpene, limonene or mixture thereof being soluble and miscible with said anise essence or anethole and alcohol and having been deodorized with activated vegetable carbon and dewaxed.

4. The drink according to claim 3 wherein said orange terpene, limonene or mixture thereof has been dewaxed by dissolving in 90% alcohol, adding to the resultant solution from 25 to 40 grams per liter of magnesium carbonate, reducing the temperature of the mixture to between about 0° and 2° C. to cause precipitation of the wax substances and separating said wax substances therefrom.

* * * * *